(12) United States Patent
Chen et al.

(10) Patent No.: US 11,766,830 B2
(45) Date of Patent: Sep. 26, 2023

(54) THREE-DIMENSIONAL PRINTER AND MANUFACTURING METHOD THEREOF

(71) Applicant: Young Optics Inc., Hsinchu (TW)

(72) Inventors: Chao-Shun Chen, Hsinchu (TW); Jia-Bin Huang, Hsinchu (TW); Kai-Yun Cheng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 139 days.

(21) Appl. No.: 17/191,660

(22) Filed: Mar. 3, 2021

(65) Prior Publication Data
US 2021/0283854 A1    Sep. 16, 2021

(30) Foreign Application Priority Data
Mar. 11, 2020   (TW) ................................ 109107951

(51) Int. Cl.
| | |
|---|---|
| *B29C 64/393* | (2017.01) |
| *G05B 19/406* | (2006.01) |
| *B33Y 10/00* | (2015.01) |
| *B33Y 50/02* | (2015.01) |
| *B29C 64/129* | (2017.01) |
| *B29C 64/277* | (2017.01) |
| *B33Y 30/00* | (2015.01) |

(52) U.S. Cl.
CPC .......... *B29C 64/393* (2017.08); *B29C 64/129* (2017.08); *B29C 64/277* (2017.08); *B33Y 10/00* (2014.12); *B33Y 30/00* (2014.12); *B33Y 50/02* (2014.12); *G05B 19/406* (2013.01); *G05B 2219/49023* (2013.01)

(58) Field of Classification Search
CPC ... B29C 64/393; B29C 64/277; B29C 64/129; B33Y 10/00; B33Y 30/00; B33Y 50/02; G05B 19/406; G05B 2219/49023
USPC .......................................................... 264/401
See application file for complete search history.

(56) References Cited

U.S. PATENT DOCUMENTS

| | | | |
|---|---|---|---|
| 5,617,242 A | 4/1997 | Weaver | |
| 5,717,513 A | 2/1998 | Weaver | |
| 7,719,740 B2 * | 5/2010 | Oden ..................... | G09G 3/346 359/290 |
| 2009/0102988 A1 * | 4/2009 | Maeda ................. | H04N 9/3155 348/756 |
| 2016/0221262 A1 * | 8/2016 | Das ....................... | B29C 64/393 |

FOREIGN PATENT DOCUMENTS

| | | |
|---|---|---|
| CN | 208133611 | 11/2018 |
| WO | 2009045502 | 4/2009 |

* cited by examiner

*Primary Examiner* — Joseph S Del Sole
*Assistant Examiner* — Lawrence D. Hohenbrink, Jr.
(74) *Attorney, Agent, or Firm* — JCIPRNET (57) ABSTRACT

A three-dimensional printer includes a projector, a tank, and a platform. The projector includes a light source, a digital micromirror device, and a controller. The digital micromirror device includes a micromirror, and the micromirror may be switched between an on state and an off state according to a control signal. The controller is electrically connected to the digital micromirror device and the light source. The controller further includes a judgement unit. The judgement unit may output the control signal to switch the micromirror to the off state when the light source is in the off state. The platform is adjacent to the tank. In addition, a manufacturing method for a three-dimensional printer is provided.

13 Claims, 6 Drawing Sheets

THREE-DIMENSIONAL PRINTER AND MANUFACTURING METHOD THEREOF

CROSS-REFERENCE TO RELATED APPLICATION

This application claims the priority benefit of Taiwan application serial no. 109107951, filed on Mar. 11, 2020. The entirety of the above-mentioned patent application is hereby incorporated by reference herein and made a part of this specification.

BACKGROUND

Technical Field

The disclosure relates to a three-dimensional printer and a manufacturing method thereof, and more particularly to a digital light processing three-dimensional printer and a manufacturing method thereof.

Description of Related Art

Conventional three-dimensional printers usually adopt a projection device to emit a light beam to irradiate photosensitive resin for a period of time, and the photosensitive resin is cured on the printing platform due to the irradiation of the light beam, thereby forming one of the layers of the workpiece. However, in a projection device adopting the technology of digital light processing (DLP), usually a digital micromirror device is disposed internally. Often, each of the pixels of the digital micromirror device includes a tiny micromirror, and each of the micromirrors has three rotation positions. One position is a micromirror in an on state that may reflect light to the projection lens, another position is a micromirror in an off state that refracts the light from the projection lens, and the last is a micromirror in the flat state. The micromirror controls the switch among the three states through a hinge to project light along a predetermined direction.

However, when the projection device projects a fixed image for a long time, the hinge of the micromirror remains in the same state for a long time, and the micromirror faces a same direction in the same position. The memory effect of the hinge results in white spots or dead spots on the screen, leading to poor printing quality of the three-dimensional printer and the short lifespan of the digital micromirror device.

SUMMARY

The disclosure provides a three-dimensional printer, which has good printing quality and reliability.

The disclosure provides a manufacturing method for a three-dimensional printer, which is adapted to produce the three-dimensional printer.

In an embodiment of the disclosure, a three-dimensional printer is disposed and it includes a projector, a tank, and a platform. The projector includes a light source, a digital micromirror device, and a controller. The digital micromirror device is disposed in a light path downstream of the light source. The digital micromirror device includes a micromirror, and the micromirror may be switched between an on state and an off state according to a control signal. The controller is electrically connected to the digital micromirror device and the light source, and the controller further includes a judgement unit. The judgement unit may output the control signal to switch the micromirror of the digital micromirror unit to the off state when the light source is in the off state. The tank is disposed in a light path downstream of the projector. The platform is disposed adjacent to the tank.

In an embodiment of the disclosure, a three-dimensional printer is disposed and it includes an ultraviolet light source, a digital micromirror device, a tank, a platform, and a controller. The digital micromirror device is disposed in a light path downstream of the ultraviolet light source. The digital micromirror device includes a micromirror. The tank is disposed in a light path downstream of the digital micromirror device. The platform is disposed adjacent to the tank. The controller is electrically connected to the digital micromirror device and the ultraviolet light source. The controller includes a judgement unit. When the ultraviolet light source is turned off, the judgement unit may switch an on/off state of the micromirror.

In an embodiment of the disclosure, a manufacturing method for a three-dimensional printer includes the following steps. A projector is disposed, and the projector includes a light source, a digital micromirror device, and a controller. The digital micromirror device is disposed in a light path downstream of the light source, and the digital micromirror device includes a micromirror. The micromirror may be switched between an on state and an off state according to a control signal. The controller is electrically connected to the digital micromirror device and the light source. The controller includes a judgement unit, which may output the control signal to switch the micromirror of the digital micromirror device to the off state when the light source is in the off state. A tank is disposed in a light path downstream of the projector. A platform is disposed adjacent to the tank.

Based on the above, in the three-dimensional printer in the embodiments of the disclosure, when the light source is turned off, the on/off state of the micromirror is adjusted so that the ratio of the time when the micromirror is in the on state to the time when the micromirror is in the off state tends to be same. The three-dimensional printer in the embodiments of the disclosure may have good manufacturing quality and good reliability. In addition, the embodiments of the disclosure further provide a manufacturing method for the three-dimensional printer.

DESCRIPTION OF THE EMBODIMENTS

Figure 1:
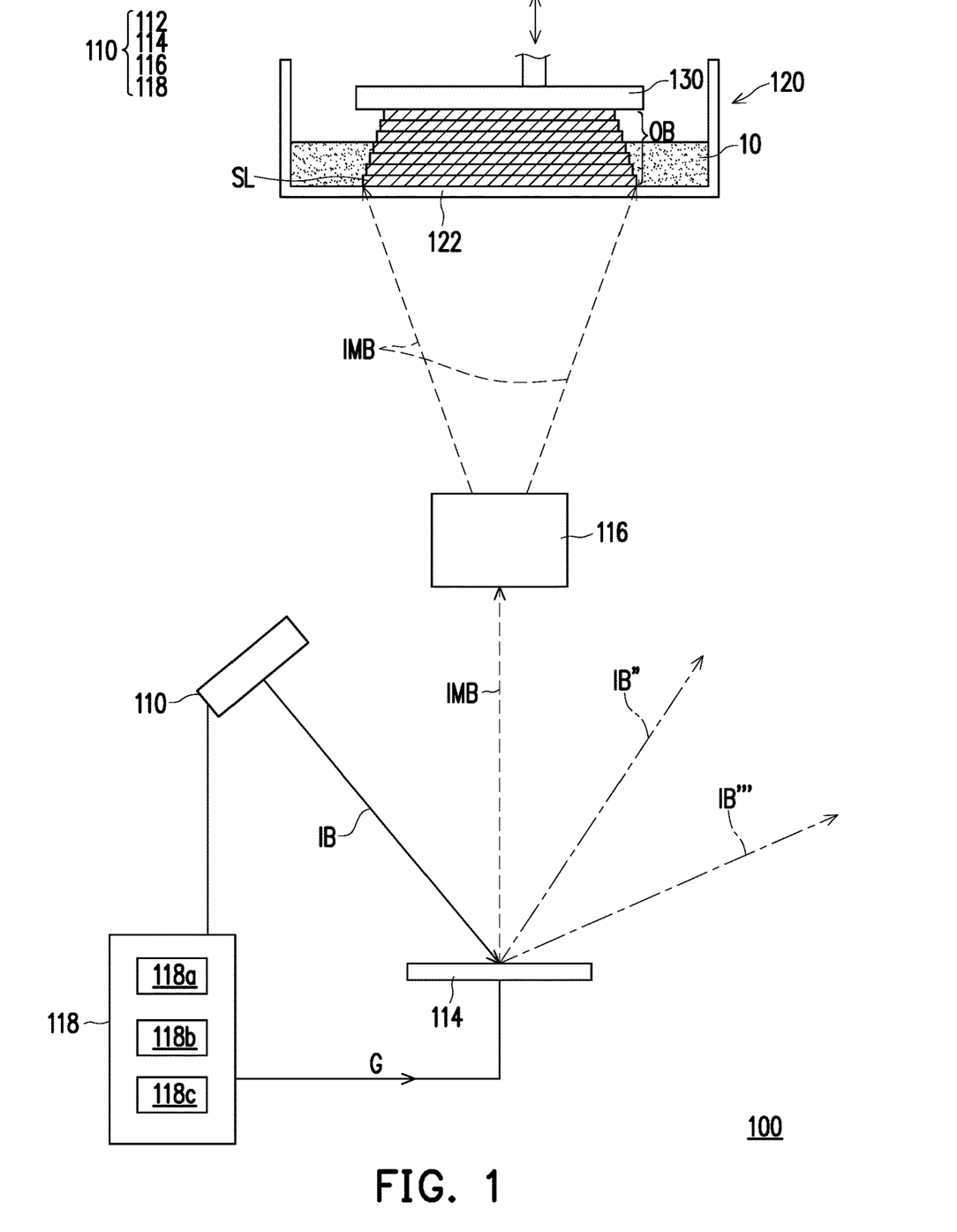
FIG. 1 is a schematic structural view of a three-dimensional printer according to an embodiment of the disclosure.
Figure 2:
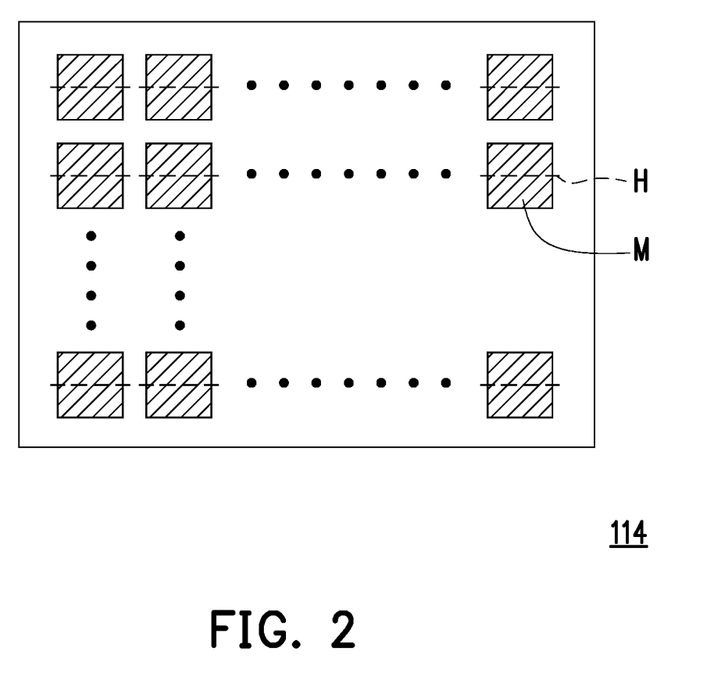
FIG. 2 is a schematic top view of the digital micromirror device in FIG. 1.
Figure 3A:
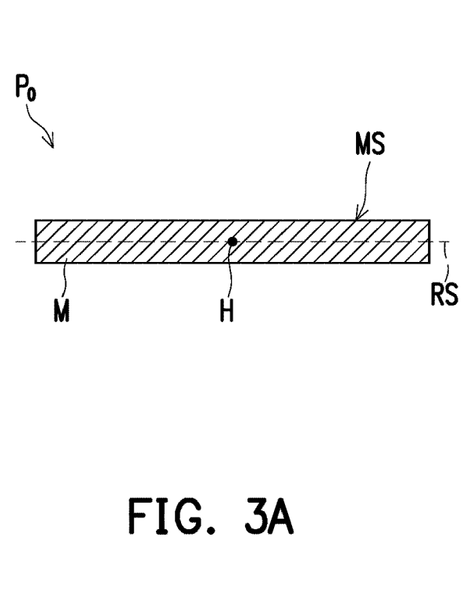
FIG. 3A to FIG. 3C are schematic views of a micromirror in a digital micromirror device in different states.
Figure 3B:
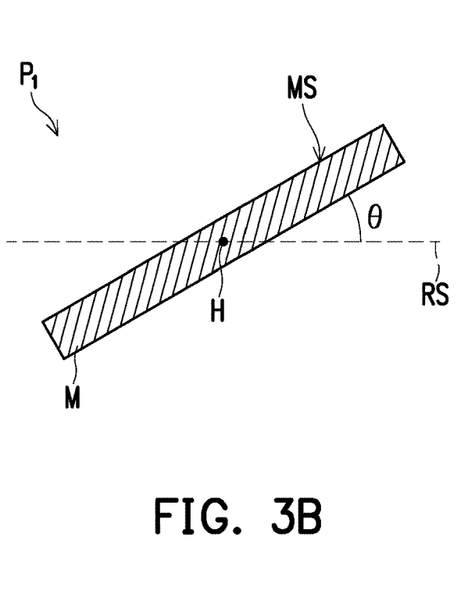
Figure 3C:
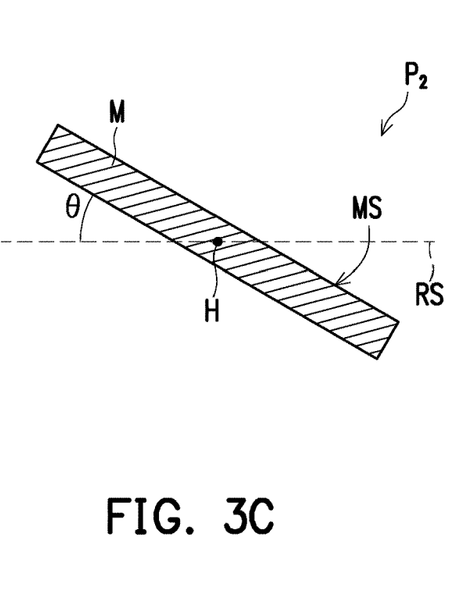

FIG. 1 is a schematic structural view of a three-dimensional printer according to an embodiment of the disclosure. FIG. 2 is a schematic top view of the digital micromirror device in FIG. 1. FIG. 3A to FIG. 3C are schematic views of a micromirror in a digital micromirror device in different states.

Referring to FIG. 1, in the embodiment, a three-dimensional printer 100 includes a projector 110, a tank 120, and a platform 130. The projector 110, which is a digital light processing (DLP) projector, is adapted to project an image beam IMB. The projector 110 further includes a light source 112, a digital micromirror device 114, a projection lens 116, and a controller 118. The tank 120 is adapted for accommodating the photocurable material 10. The photocurable material 10 may be in a liquid state, a colloidal state, a fluid state, or a powder state. In the embodiment, the photocurable material 10 may be in a liquid state. Due to the characteristics of the material, the photocurable material 10 may form a workpiece OB after being cured by light. The controller 118 further includes a recording unit 118a, a judgment unit 118b, and a data unit 118c, which are illustrated in detail in the following paragraphs.

The light source 112 is a light-emitting element that may emit an illuminating beam IB. The light-emitting element includes, for example, a light-emitting diode (LED), a laser diode (LD), or other suitable light-emitting elements. The wavelength range of the light provided by the light-emitting element needs to be matched with the photocurable material 10. In the embodiment, the light source 112 is an ultraviolet light source, and the projector 110 is an ultraviolet DLP projector.

Referring to FIG. 2, the digital micromirror device 114 includes a plurality of micromirrors M. The micromirrors M are arranged in an array. Referring to FIG. 3A to FIG. 3C, each of the micromirrors M is adapted to swing back and forth through a hinge H and stays in a state switching among a flat state, an on state, and an off state. In the embodiment, the hinges H of the micromirrors M are substantially parallel to one another.

Referring to FIG. 3A, when the micromirror M is in a flat state, the micromirror M is at a position $P_0$ and the angle between the micromirror M and the horizontal reference axis RS is 0 degrees. Referring to FIG. 3B, when the micromirror is in an on state, the micromirror M is rotated through the hinge H so that the micromirror M is in the position $P_1$, and a non-zero angle θ (e.g., the angle θ ranges from 12 degrees to 17 degrees) is formed between the micromirror M and the horizontal reference axis RS. Therefore, the illuminating beam IB from the light source 112 is reflected by the micromirror M to the projection lens 116, and the on state of the micromirror M is also called the bright state. Referring to FIG. 3C, when the micromirror M is in an off state, the micromirror M is rotated through the hinge H so that the micromirror M is in the position $P_2$, and a non-zero angle is formed between the micromirror M and the horizontal reference axis RS (e.g., the angle θ ranges from −12 degrees to −17 degrees). Therefore, the illuminating beam IB from the light source 112 is reflected by the micromirror M and is refracted from the projection lens 116, and the off state of the micromirror M is also called the dark state.

The projection lens 116 is a combination of one or more optical lenses with diopter, for example. The tank 120 is an accommodating tank, for example. In the embodiment, a transparent bottom 122 is disposed in the tank 120 to allow light beams to pass through. However, the material of the tank 120 is not limited to glass, which may also include molecular materials with a high transmittance, such as resin or plastics.

The controller 118 may be a calculator, a micro controller unit (MCU), or a central processing unit (CPU), or other programmable microprocessors, a digital signal processor (DSP), programmable controllers, application specific integrated circuits (ASICs), a programmable logic device (PLD), or other similar devices.

The platform 130 may move in a vertical direction away from or close to the bottom 122 of the tank 120. The workpiece OB is formed after the photocurable material 10 is cured by light, and the workpiece OB may be formed on the platform 130 layer by layer.

In the embodiment, the controller 118 is electrically connected to the digital micromirror device 114 and the light source 112. In addition, the controller 118 has unit modules that perform different functions. Specifically, the controller 118 includes the recording unit 118a, the judgement unit 118b, and the data unit 118c. The recording unit 118a records the on/off state of the micromirror M. The judgement unit 118b switches the on/off state of the micromirror M according to a specific situation. The judging criteria that the judgement unit 118b adopts are illustrated in detail in the following paragraphs. The data unit 118c stores the design data of the 3D model.

In the following paragraphs, the configuration relationships among the elements are illustrated in detail.

Referring to FIG. 1, the digital micromirror device 114 is disposed at the light path downstream of the light source 112. The projection lens 116 is disposed at the light path downstream of the digital micromirror device 114. The tank 120 is disposed at the light path downstream of the projector 110. Light is transmitted from the light path upstream to the light path downstream. Therefore, the light path downstream of an element may be understood as the part of the light path after light passes through the element. For example, the light path downstream of the light source 112 is the light path after the light is emitted from the light source 112, and so on. The platform 130 is adjacent to the tank 120.

FIG. 4A to FIG. 4D are different operation timing diagrams of the light source and the digital micromirror device of the three-dimensional printer of FIG. 1. FIG. 5 is a diagram illustrating the relationship between the working state time ratio and the maximum recommended operating temperature of the micromirror during a fixed lifespan. In the following paragraphs, FIG. 1, FIG. 4A to FIG. 4D, and FIG. 5 are used to illustrate the action method of the three-dimensional printer 100 and the corresponding technical effects.

Refer to FIG. 4A to FIG. 4D. In FIG. 4A to FIG. 4D, different timings are shown and divided into a pre-work timing $T_0$, multiple first timings $T_1$, and multiple second timings $T_2$. The first timings $T_1$ and the second timings $T_2$ are alternately arranged with one another.

Figure 4A:
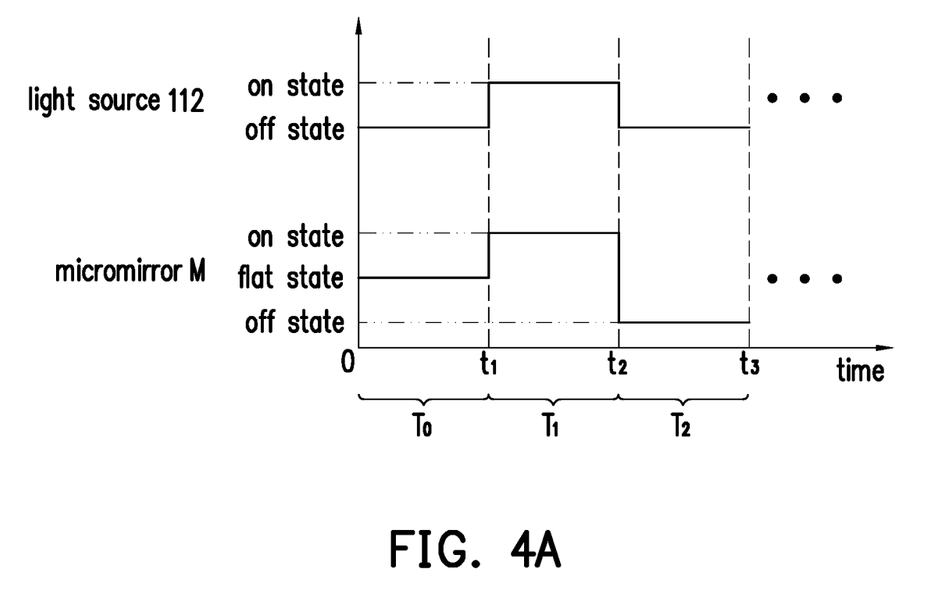
FIG. 4A to FIG. 4D are different operation timing diagrams of the light source and the digital micromirror device of the three-dimensional printer in FIG. 1.
Figure 5:
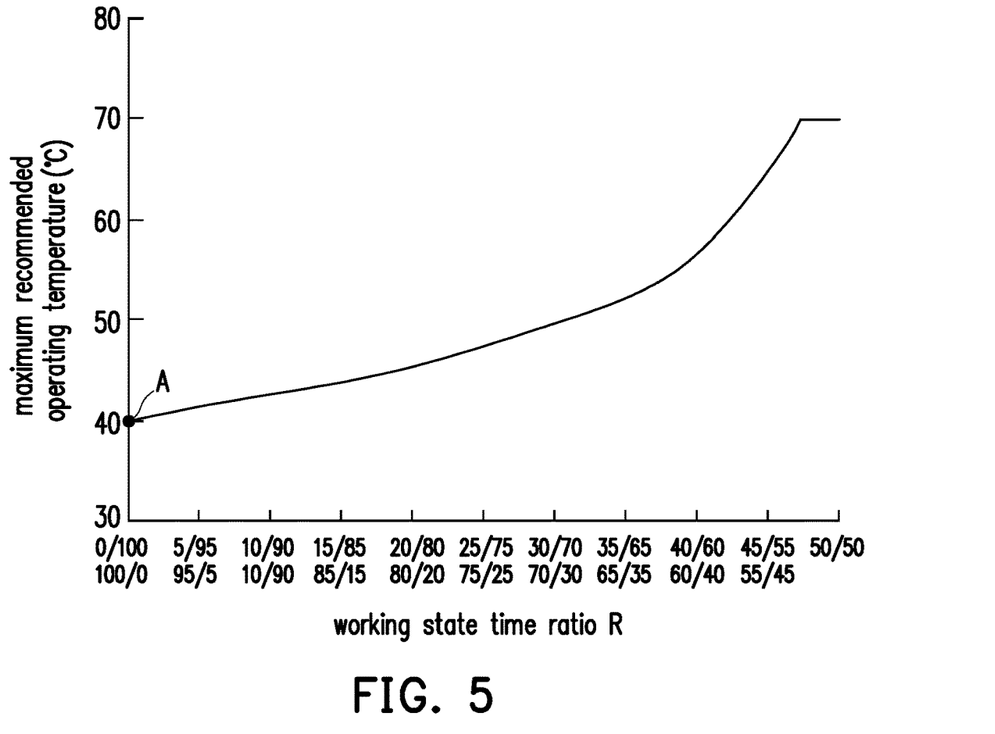
FIG. 5 is a diagram illustrating the relationship between the working state time ratio and the maximum recommended operating temperature of the micromirror during a fixed lifespan.

Refer to FIG. 4A first. In the pre-work timing $T_0$, the three-dimensional printer 100 is turned off, the light source 112 is turned off, and each of the micromirrors M in the digital micromirror device 114 is in the flat state as shown in FIG. 3A.

In the first timing $T_1$ (i.e., from $t_1$ seconds to $t_2$ seconds), the three-dimensional printer 100 is turned on, and the light source 112 and the digital micromirror device 114 are turned on to print the workpiece OB. Therefore, the first timing $T_1$ may also be called the print timing. In detail, in the first timing $T_1$, the light source 112 emits the illuminating beam IB, which is then transmitted to the digital micromirror device 114, and meanwhile the controller 118 sends a control signal G to the digital micromirror device 114 according to the 3D design data stored in the data unit 118c to determine where the positions of the micromirrors M are. Some of the micromirrors M may be in the on state, and some may be in the off state. In FIG. 4A, the micromirror M in the on state is illustrated as an example, and the recording unit 118a records the on/off state of the micromirror M. The states of the micromirrors M are determined according to the 3D design data, so when the illuminating beam IB irradiates the micromirrors M, the micromirrors M in the on state may reflect part of an illuminating beam IB' to the projection lens 116 to form the image beam IMB, the image beam IMB then penetrates the bottom 122 of the tank 120 through the projection lens 116 to irradiate the photocurable material 10, and the photocurable material 10 may be cured to form a cross-sectional layer SL of the workpiece OB after being irradiated with light for a period of time. On the other hand, the micromirrors M in the flat state or in the off state may reflect part of illuminating beams IB" and IB'" respectively to be refracted from the projection lens 116.

In the second timing $T_2$ (i.e., from $t_2$ seconds to $t_3$ seconds), the three-dimensional printer 100 is also turned on. After the cross-sectional layer SL is formed, the light source 112 is now turned off, and the platform 130 may move in a direction approaching to or away from the tank 120 (i.e., the platform 130 is in a moving state), so that the platform 130 is moved to the printing position where the next cross-sectional layer SL is to be printed. Accordingly, the second timing $T_2$ may also be called the preparation timing. Meanwhile, the judgement unit 118b determines that the light source 112 is in the off state and the platform 130 is in the moving state, and outputs the control signal G to control the micromirror M to switch its state from the on state as shown in FIG. 3B to the off state as shown in FIG. 3C.

On the other hand, refer to FIG. 4A again. In the foregoing paragraphs and FIG. 4, it is illustrated that some of the micromirrors M are first in the on state and then switched to be in the off state in the first timing $T_1$. In other embodiments, if some of the micromirrors M are first in the off state in the first timing $T_1$, through the judgement unit 118b, the states of the micromirrors M are switched from the off state as shown in FIG. 3C to the on state as shown in FIG. 3B in the second timing $T_2$.

Refer to FIG. 5. The horizontal axis in FIG. 5 represents the working state time ratio R, and the vertical axis represents the maximum recommended operating temperature. The working state time ratio R is defined as the following formula (1):

$$R = \text{the time when the micromirror is in the on state} / \text{the time when the micromirror is in the off state} \quad (1)$$

0/100 and 100/0 respectively represent that the micromirror M is in the off state and the micromirror M is in the on state; 40/60 and 60/40 respectively represent that the time when the micromirror M is in the on state and the time when the micromirror M is in the off state are respectively 40:60 and 60:40; and other values may represent other time when the micromirror in the on state and other time when in the off state. Note that the working state time ratio R does not include the time when the micromirror M is in the flat state. Take point A in FIG. 5 as an example. The point A means that during a fixed lifespan, if the working state time ratio R of the micromirror M is 0/100 or 100/0, the maximum recommended operating temperature is 40 degrees, and so on. Therefore, from FIG. 5, it is seen that the more unbalanced the working state time ratio R is (e.g., 0/100 or 100/0), the less the maximum recommended operating temperature is (e.g., 40 degrees), the standard for the temperature required by the micromirror M is stricter, and the micromirror M requires a higher-level heat dissipation specification, but it is difficult to reach such an operating temperature under normal working conditions. Moreover, if the working state time ratio R tends to be more balanced (e.g., approaching to 50/50), the maximum recommended operating temperature is greater (e.g., 70 degrees), the standard for the temperature required by the micromirror M is looser, and the three-dimensional printer may be matched with lower-level heat dissipation specifications.

Moreover, refer to both FIG. 4A and FIG. 5. In the three-dimensional printer 100 in the embodiment, when printing the workpiece OB in the first timing T1, the recording unit 118a may record the on/off state of the micromirror M in the first timing T1 (e.g., the on state as shown in FIG. 3B and FIG. 4A), and when the light source 112 is turned off and the platform 130 is moving in the second timing T2, the judgement unit 118b may output the control signal G to switch the on/off state of the micromirror M (e.g., switch to the off state as shown in FIG. 3C), so that the micromirror M is in the on state or in the off state different from the previous state. Therefore, the working state time ratio between the time when the micromirror M is in the on state and the time when the micromirror M is in the off state may tend to be same, the hinge H of the micromirror M is less prone to memory effects, white spots or dead spots on the screen do not happen to the projector 110, and therefore the three-dimensional printer 100 has good printing quality. Moreover, according to FIG. 5, if the working state time ratio R tends to be same, the standard for the maximum recommended operating temperature of the digital micromirror device 114 may be looser, the lifespan of the digital micromirror device 114 is prolonged, and the digital micromirror device has better reliability.

Figure 4B:
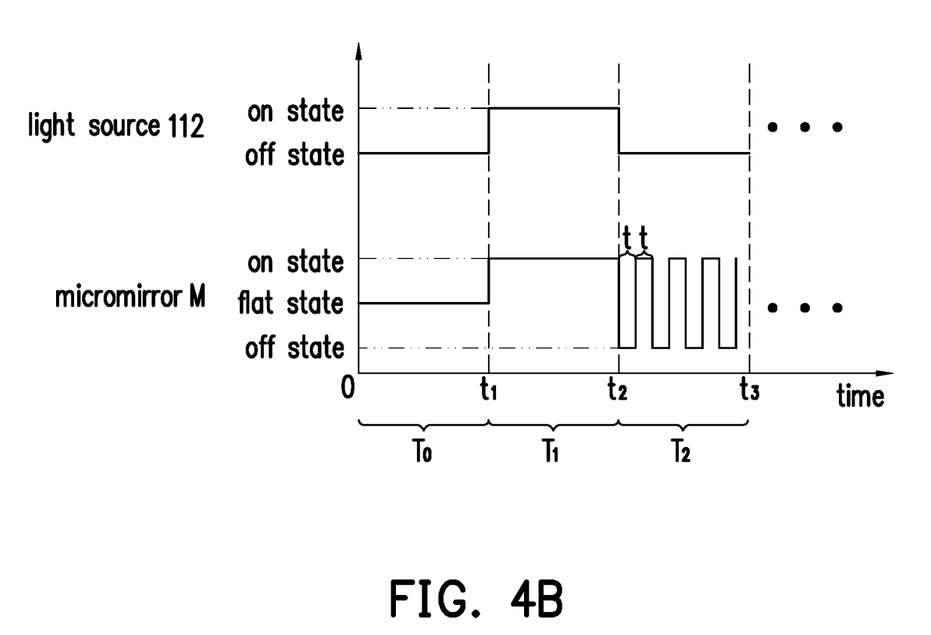

Refer to FIG. 4B. FIG. 4B shows the judgement unit 118b controls the state of the micromirror in another way. The action mode of the micromirror M in FIG. 4B is similar to that in FIG. 4A. The main difference is that in the second timing $T_2$, the judgement unit 118b periodically switches the on/off state of the micromirror M. More specifically, in the second timing $T_2$, the judgement unit 118b sets the micromirror M to switch between the on state and the off state alternately in the same time t.

Figure 4C:
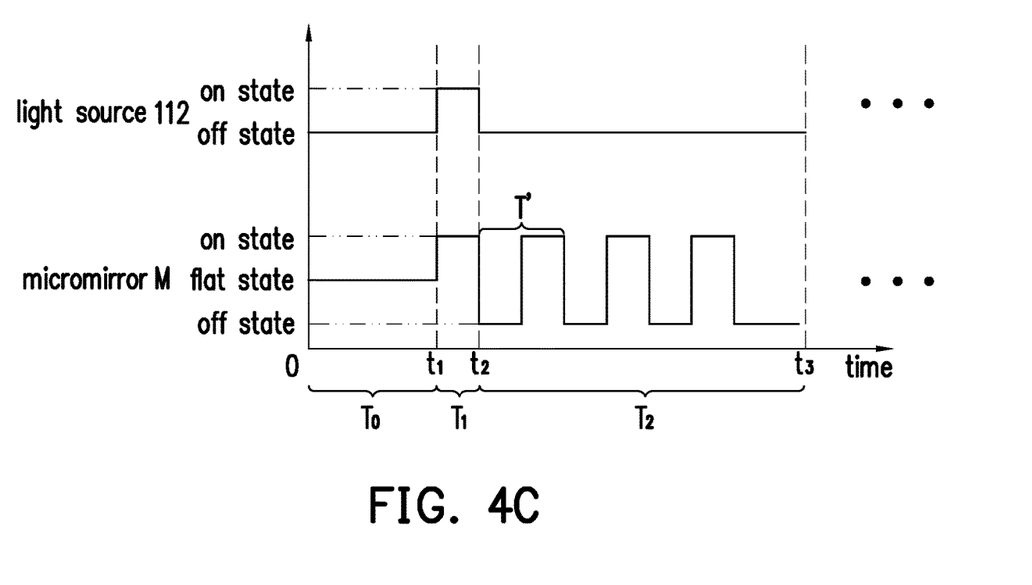

Refer to FIG. 4C. FIG. 4C shows the judgement unit 118b controls the state of the micromirror in another way. The action mode of the micromirror M in FIG. 4C is similar to that in FIG. 4B. The main difference is that the judgement unit 118b determines the period T' of the on/off state of the micromirror M in the second timing $T_2$ according to the duration of the on/off state of the micromirror M in the first timing $T_1$ (e.g., from $t_1$ second to $t_2$ second). In detail, in the second timing T2, the judgement unit 118b sets the duration of the off state of the micromirror M as $t_2-t_1$ seconds and the duration of the on state of the micromirror M as $t_2-t_1$ seconds; in other words, the period of the on/off state of the micromirror M is set to $2(t_2-t_1)$ seconds.

Figure 4D:
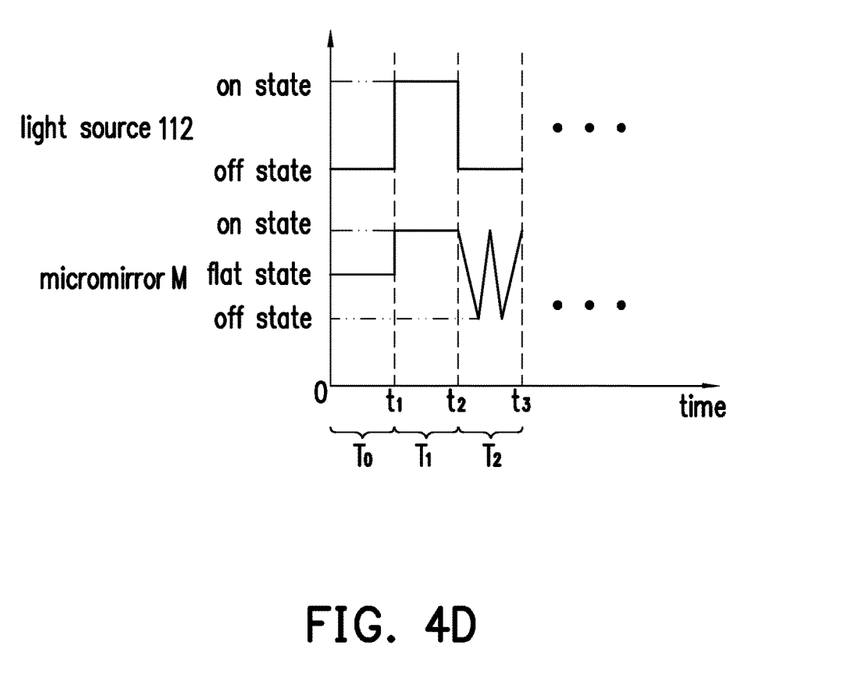

Refer to FIG. 4D. FIG. 4D shows the judgement unit 118b controls the state of the micromirror in another way. The action mode of the micromirror M in FIG. 4D is similar to that of FIG. 4A. The main difference is that in the second timing T2, the judgement unit 118b randomly switches the on/off state of the micromirror M.

Figure 6:
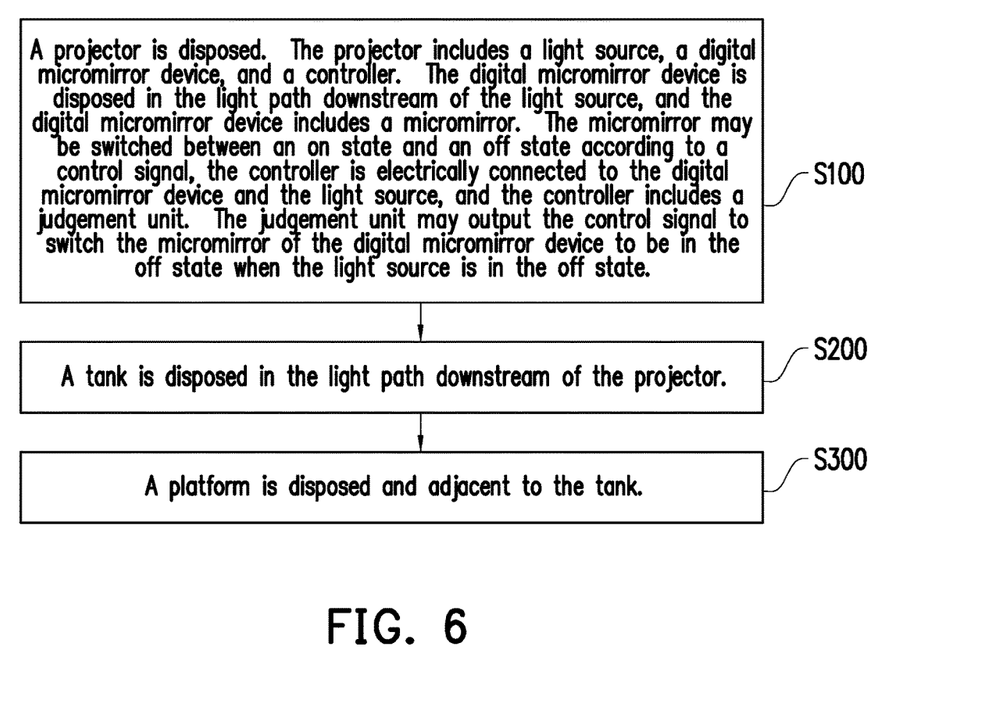
FIG. 6 is a flowchart illustrating the steps of a manufacturing method for a three-dimensional printer.

FIG. 6 is a flowchart illustrating the steps of a manufacturing method for a three-dimensional printer according to an embodiment of the disclosure.

Refer to FIG. 6. The manufacturing method mainly includes the following three steps S100-S300.

Step S100: A projector is disposed. The projector includes a light source 112, a digital micromirror device 114, and a controller 118. The digital micromirror device 114 is disposed in the light path downstream of the light source 112, and the digital micromirror device 114 includes a micromirror M. The micromirror M may be switched between an on state and an off state according to a control signal G, the controller 118 is electrically connected to the digital micromirror device 114 and the light source 112, and the controller includes a judgement unit 118b. The judgement unit 118b may output the control signal G to switch the micromirror M of the digital micromirror device 114 to the off state when the light source 112 is in the off state and the platform 130 is in the moving state.

Step S200: A tank 120 is disposed in the light path downstream of the projector 110.

Step S300: A platform 130 is disposed and adjacent to the tank 120.

Based on the above, in the three-dimensional printer in the embodiments of the disclosure, the judgment unit in the controller may switch the on/off state of the micromirror in the duration when the light source is turned off and the platform is moving to adjust the ratio of the time when the micromirror in the digital micromirror device is in the on state to the time when the micromirror in the digital micromirror device is in the off state, so that both time tends to be same. Therefore, the hinge of the micromirror is less prone to memory effect, and the three-dimensional printer in the embodiments of the disclosure may have good manufacturing quality and good reliability. In addition, the embodiments in the disclosure further provide a manufacturing method for manufacturing the three-dimensional printer.

What is claimed is:

1. A manufacturing method for a three-dimensional printer, comprising:
    disposing a projector comprising a light source, a digital micromirror device, and a controller, wherein the digital micromirror device is disposed in a light path downstream of the light source, the digital micromirror device comprises a micromirror, the micromirror is switched between an on state and an off state according to a control signal, the controller is electrically connected to the digital micromirror device and the light source, the controller comprises a judgement unit, and the judgement unit is adapted to output the control signal to switch the micromirror of the digital micromirror device from previously the on state or the off state to another different state when the light source is in the off state;
    disposing a tank in the light path downstream of the projector; and
    disposing a platform to be adjacent to the tank.

2. A three-dimensional printer, comprising:
    a projector comprising:
    a light source;
    a digital micromirror device disposed in a light path downstream of the light source, and a micromirror on the digital micromirror device is switched between an on state and an off state according to a control signal; and
    a controller electrically connected to the digital micromirror device and the light source, the controller adapted to output the control signal to switch the micromirror of the digital micromirror device from previously the on state or the off state to another different state when judging the light source is turned off;
    a tank disposed in the light path downstream of the projector; and
    a platform disposed adjacent to the tank.

3. The three-dimensional printer according to claim 2, wherein when the light source is in the on state, the micromirror is controlled to be in the on state or the off state according to the control signal.

4. The three-dimensional printer according to claim 3, wherein when the light source is in the on state,
    if the micromirror is in the on state according to the control signal, a judgement unit outputs another control signal when the light source is in the off state to switch the micromirror to be in the off state, and
    if the micromirror is in the off state according to the control signal, the judgement unit outputs another control signal when the light source is in the off state to switch the micromirror to be in the on state.

5. The three-dimensional printer according to claim 2, wherein the controller further comprises a judgement unit.

6. The three-dimensional printer according to claim 2, wherein the projector further comprises a projection lens disposed in the light path downstream of the digital micromirror device.

7. The three-dimensional printer according to claim 2, wherein the tank is adapted to accommodate a photocurable material.

8. The three-dimensional printer according to claim 2, wherein the light source is an ultraviolet light source, and the controller comprises
    a judgement unit adapted to output a control signal when the ultraviolet light source is turned off, so as to switch the micromirror of the digital micromirror device from the on state or an off state to a different state.

9. The three-dimensional printer according to claim 8, wherein when the ultraviolet light source is turned off, the judgment unit outputs a control signal to periodically switch the on/off state of the micromirror.

10. The three-dimensional printer according to claim 9, wherein according to a duration of the on/off state of the micromirror when the ultraviolet light is turned on, the judgement unit determines a period of the on/off state of the micromirror when the ultraviolet light source is turned off.

11. The three-dimensional printer according to claim 8, wherein when the ultraviolet light source is turned off, the judgment unit outputs a control signal to randomly switch the on/off state of the micromirror.

12. The three-dimensional printer according to claim 8, wherein the three-dimensional printer further comprises a projection lens disposed in the light path downstream of the digital micromirror device.

13. The three-dimensional printer according to claim 8, wherein the tank is adapted to accommodate a photocurable material.

* * * * *